United States Patent [19]
Barkans et al.

[11] Patent Number: 5,649,083
[45] Date of Patent: Jul. 15, 1997

[54] SYSTEM AND METHOD FOR DITHERING AND QUANTIZING IMAGE DATA TO OPTIMIZE VISUAL QUALITY OF A COLOR RECOVERED IMAGE

[75] Inventors: Anthony C. Barkans; David L. McAllister, both of Fort Collins, Colo.

[73] Assignee: Hewlett-Packard Company, Palo Alto, Calif.

[21] Appl. No.: 228,472

[22] Filed: Apr. 15, 1994

[51] Int. Cl.$^6$ .................................................. G06T 5/20
[52] U.S. Cl. ........................................ 395/131; 395/132
[58] Field of Search ........................ 395/131, 132; 345/136–138, 147, 149, 150, 152, 153, 186; 358/455–459; 348/625

[56] References Cited

U.S. PATENT DOCUMENTS

| 3,681,650 | 8/1972 | Koll | 315/30 |
|---|---|---|---|
| 5,402,534 | 3/1995 | Yeomans | 395/131 |

FOREIGN PATENT DOCUMENTS

| 0547382A1 | 11/1992 | European Pat. Off. . |
|---|---|---|
| 0576162A1 | 6/1993 | European Pat. Off. . |
| 0652671A2 | 10/1994 | European Pat. Off. . |
| 2007849 | 1/1970 | France . |

OTHER PUBLICATIONS

Proceedings of the Society for Information Display, vol. 25, No. 4, 1984, New York (US) pp. 321–329, XP73356. H. Kotera et al. 'A Poster–Size Color Ink–Jet Printing System' *p. 342, right column, paragraph B*.

*Primary Examiner*—Joseph H. Feild
*Assistant Examiner*—Cliff N. Vo

[57] ABSTRACT

A color graphics pipeline has a separate encoder with a dither table for processing each color value in pixel data received from a host processor or rasterizer. The encoders modify color values and dither noise values and also combine both positive and negative dither noise values with the color values, for independent optimization of each color and for better edge detection in a color recovery filter within a decoder of the pipeline. Each encoder comprises the following elements. A comparator mechanism compares a color value with a predetermined cutoff value. A dither table provides dither noise values. An offset mechanism modifies the dither noise values to derive a modified dither noise value when the color value is greater than or equal to the predetermined cutoff value. An aliasing mechanism aliases the color value with other color values below the predetermined cutoff value to derive an aliased color value when the color value is less than the predetermined cutoff value. An adder mechanism adds the unmodified dither noise or modified dither noise to the aliased color value or nonaliased color value, respectively, to derive the dithered color value. A clamping mechanism ensures that the dithered color value resides within a predetermined color range. Finally, a quantizing mechanism quantizes the dithered color value to derive a quantized/dithered color value for storage in memory, such as in a frame buffer.

16 Claims, 9 Drawing Sheets

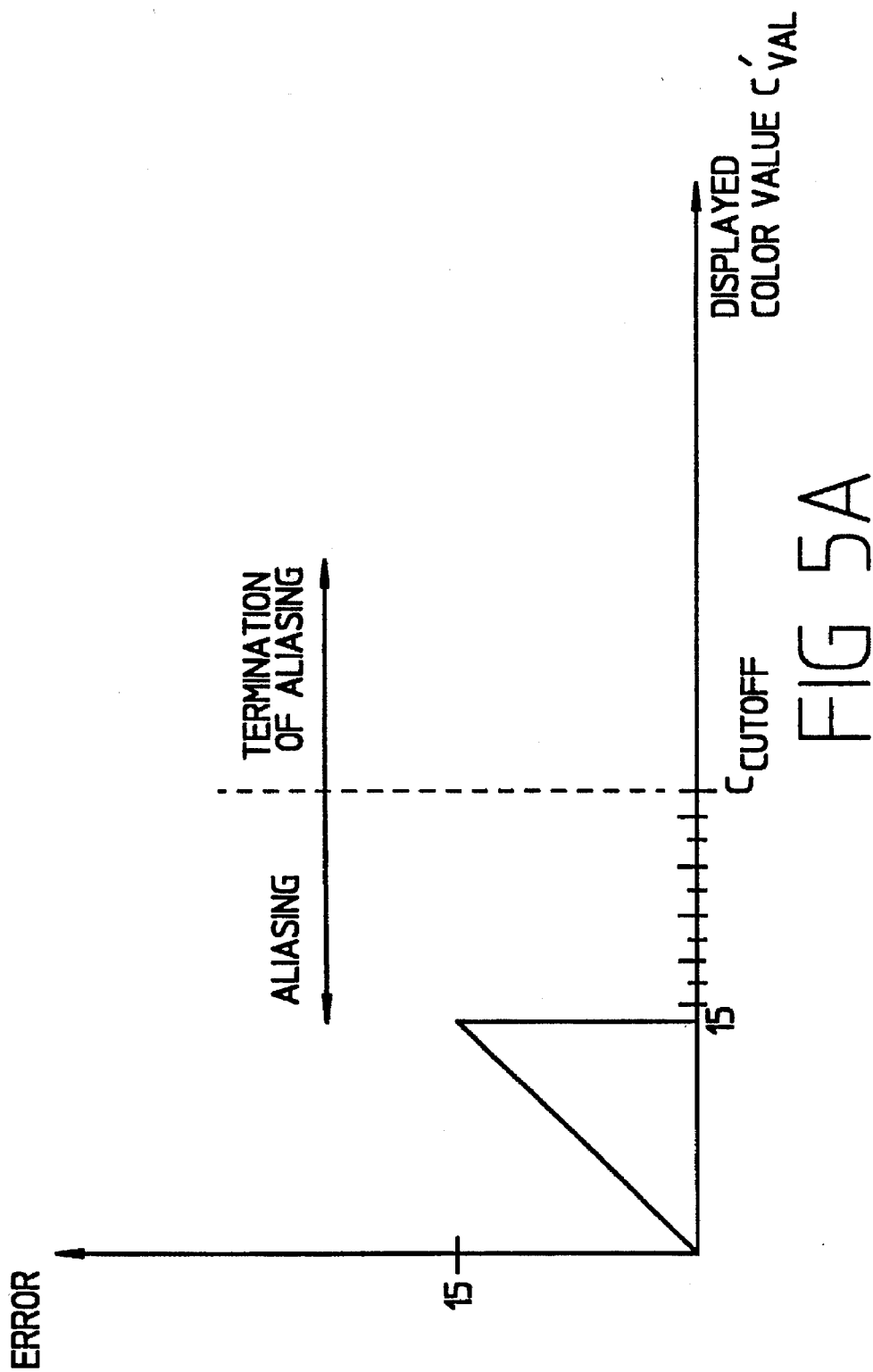

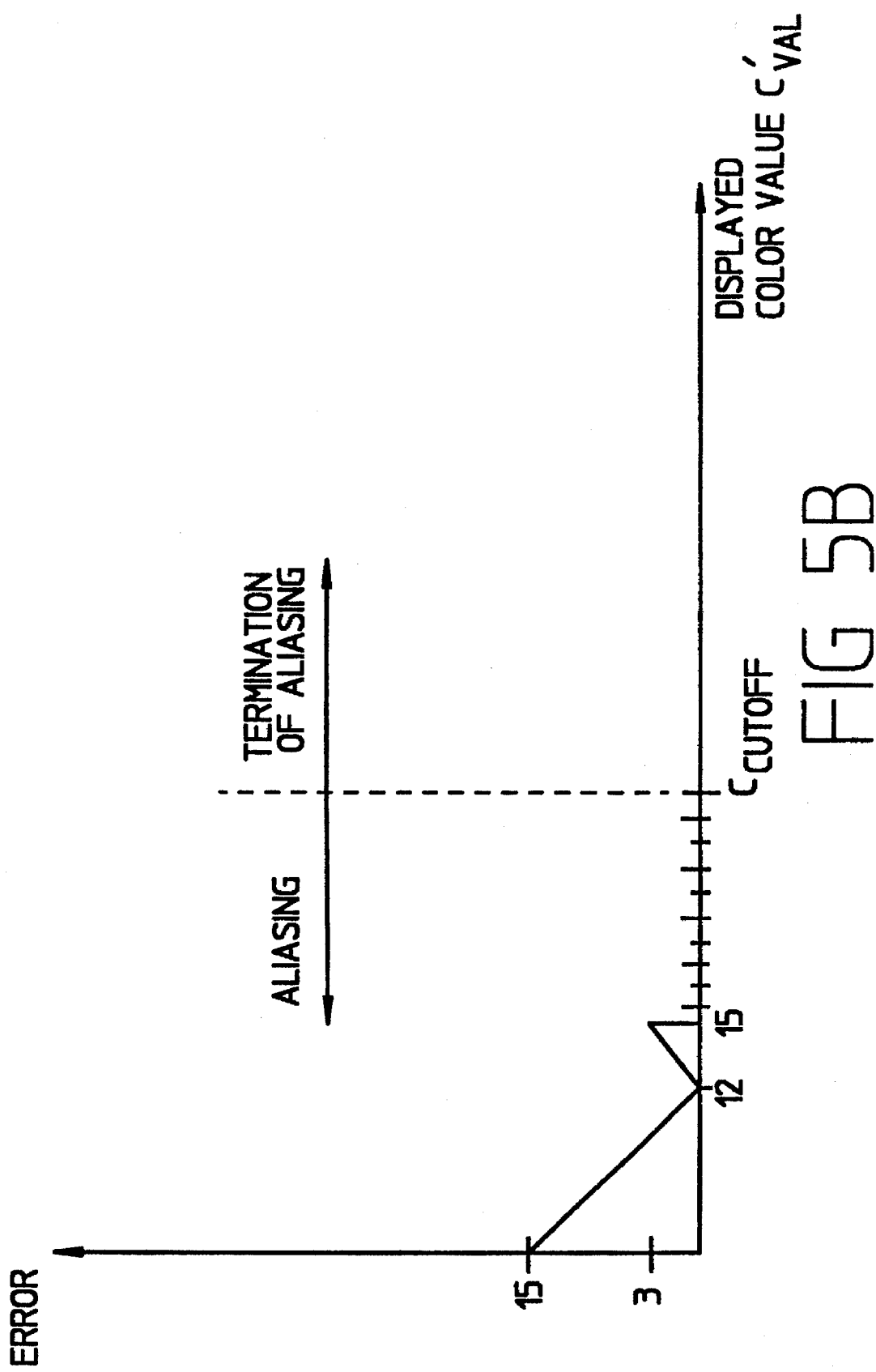

SYSTEM AND METHOD FOR DITHERING AND QUANTIZING IMAGE DATA TO OPTIMIZE VISUAL QUALITY OF A COLOR RECOVERED IMAGE

FIELD OF THE INVENTION

The present invention generally relates to color computer graphics, and more particularly, to a system and method for optimally dithering and quantizing image data in a graphics pipeline.

BACKGROUND OF THE INVENTION

The field of computer graphics concerns the creation, storage, manipulation, and display of images by a processor. FIG. 1 illustrates a typical graphics pipeline for this purpose. As shown in FIG. 1, the typical graphics pipeline 11 comprises a host processor 12 for generating image data. Each byte of image data often has 24 data bits defining the color intensity parameters for each picture element (pixel), 8 data bits of which define the intensity of a first color, 8 data bits of which define the intensity of a second color, and 8 data bits of which define the intensity of a third color. The first, second, and third colors could define any color domain, for instance, YUV or RGB (red, green, blue), but for purposes of discussion herein, the latter is assumed. Moreover, each of the foregoing 8-bit bytes defining each color is referred to as a color value for each pixel.

An encoder 14 encodes and processes the image data for storage in a frame buffer 16. The encoder 14 may perform quantization (such as truncation), dithering, rasterization, and/or other subprocessing functionality. In general, quantization involves reducing the bit length of each color value generated by the host processor 12 prior to storage in the frame buffer 16. In other words, when quantization is employed, a smaller number of colors is used to simulate a larger number of colors. As an example, it is sometimes desirable to reduce a 24 bit word defining the color intensities of a pixel to 12 or 8 bits. The process of reducing the bit length of a color value is highly desirable in order to minimize the size of the requisite frame buffer 16, thereby minimizing memory requirements and reducing the cost of the graphics pipeline 11. However, needless to say, quantization results in lost color data for each pixel, and therefore, techniques such as dithering have been developed in an attempt to compensate for this lost color data.

Dithering is well known in the art, see, for example, J. D. Foley and A. P. Van Dam, *Fundamental of Interactive Computer Graphics*, I.S.B.N.: 0-201-14 468-9 and U.S. Pat. No. 4,956,638 to Larky, et al. In general, dithering is a technique where noise is combined with the full precision color value prior to quantization in order to derive a dithered color value. Then, the dithered color value is quantized to some predetermined number of levels. For example, if the full precision of a color value is represented by an 8-bit byte (i.e., the color can take on a value from 0 to 255), then at each pixel a small amount of noise (typically less than or equal to 5 data bits) is combined with the color value. The dithered color value is then quantized to some smaller number of data bits, typically 2, 3, or 4 data bits. One commonly used quantization method is truncation, but other processes are also used. As a result of dithering and quantization, the color value stored for each pixel in the frame buffer 16 will provide a reasonable approximation of the full precision color that it represents.

After the color value has been stored in the frame buffer 16, the color value may be decoded by a decoder 18 having one or more color maps. As an example, FIG. 1 shows color maps 19r, 19g, 19b corresponding with each color, red, green, and blue. The color values are used as indices into the color maps 19r, 19g, 19b, which are generally color look-up tables, for determining the actual color to illuminate each pixel. Sometimes, correction functions (e.g., gamma function) are programmed into the color maps 19r, 19g, 19b to the desired visual effect on the display device 24. The image data read from the color maps 19r, 19g, 19b is converted to analog signals via respective digital-to-analog converters (DAC) 22r, 22g, 22b, which in turn provides these analog signals to the video display 24. Optionally, the DAC's could be replaced with drivers for a liquid crystal display (LCD).

Because dithering involves reducing the number of colors available for display, dithering gives rise to visible artifacts on the screen of the display device 24. Accordingly, there has been much research in the industry in developing dithering techniques which minimize visible artifacts on the screen of the display device 24. In fact, the artifacts manifest themselves as a matted pattern on the screen of the display device 24. Traditionally, there have been two basic approaches for enhancing the dithering process. One approach involves breaking up the ordered dithered pattern by randomizing the noise across larger pixel regions as opposed to within smaller pixel regions. Another approach involves changing the quantization levels that can be displayed to more closely match the response of the human eye.

Another approach to improving dithered data involves a color recovery system employed in the decoder 18. This system significantly reduces the matting and discrete bands of color in an image. One such color recovery system is described in the application entitled, "Method and Apparatus for Improved Color Recovery in a Computer Graphics System," filed on Mar. 27, 1992, having Ser. No. 07/859,213 (now U.S. Pat. No. 5,598,184), the disclosure which is incorporated herein by reference as if set forth in full hereinbelow. The color recovery filter in the foregoing document is situated within the decoder 18 of the graphics pipeline 11. In the process of decoding, the filter essentially invokes an averaging methodology. A weight is assigned to each color value in a region of the filter. The weights around a pixel of interest are averaged together to derive a result which is assigned to the particular pixel of interest. Accordingly, when the filter scans through dithered data from a frame buffer which has come from a flat color field, the data passes through the filter where dithering artifacts are removed and each displayed color value is as close as possible to that in the original flat field. However, when the filter encompasses an edge of a flat color field, the weights accorded to the various color values are redistributed, and the average is obtained in accordance with the redistributed weights. In short, the redistribution of weights involves the following. When the filter encompasses an edge, the weights are based upon which side of the edge the color values are located. The color recovery filter comprises an edge detect circuit corresponding with each of the colors red, green, and blue, for detecting the edges.

Although the foregoing approaches have some merit in improving the dithering and quantization processes while still reducing the amount of data required to be stored in memory, these prior art approaches still are not optimum. Visible artifacts remain in the image displayed by the display device 24 as a result of the dithering and quantization. This is especially true when quantizing a 24 bit word for a pixel to 8 bits. Hence, new approaches to dithering and/or quantization are needed in the industry for generating higher fidelity images, while still reducing the amount of data required to be stored in memory.

SUMMARY OF THE INVENTION

Therefore, an object of the present invention is to overcome the deficiencies and inadequacies of prior art as noted above and as generally known in the industry.

Another object of the present invention is to provide a system and method for optimizing dithering and quantization of image data.

Another object of the present invention is to provide a system and method for enhancing color recovery in a graphics pipeline.

Another object of the present invention is to provide a system and method for mapping a larger number of color values to a smaller number of color values which matches the capabilities of a color recovery filter in a decoder.

Another object of the present invention is to provide a system and method for effectively increasing the edge detection capabilities of a color recovery filter for the ultimate purpose of improving image quality.

Another object of the present invention is to provide a system and method for minimizing color error in an image to be displayed or printed.

Briefly described, the system of the present invention comprises an independent encoder for dithering and quantizing each color of a graphics pipeline. Each encoder comprises the following. A comparator mechanism compares a color value with a predetermined cutoff value. A dithering mechanism generates dither noise. An aliasing mechanism aliases the color value with other color values below the predetermined cutoff value to derive an aliased color value when the color value is less than the predetermined cutoff value. In the context of this document, "aliasing" means that multiple values are mapped to a single value, thus rendering the multiple values indistinguishable for further processing. An example would be masking off the lsb (least significant bit) of a value such that the value 2 and 3 become indistinguishable. An offset mechanism modifies the dither noise value when the color value is greater than the predetermined cutoff value to derive a modified color value. Further, an adder mechanism adds the dither noise to the aliased color value to derive the dithered color value, or alternatively, adds the modified dither noise to the nonaliased color value to derive the dithered color value. A clamping mechanism ensures that the dithered color value resides within a predetermined color range. Finally, a quantizing mechanism quantizes the dithered color value to derive a quantized/dithered color value for storage in memory, such as in a frame buffer. Significantly, in the foregoing system, each color has its own exclusive dither table, or matrix. This feature is important in a system with color recovery since it enhances edge detection capabilities. In addition, independent dither tables can be independently optimized for improved visual quality.

In each of the aforementioned encoders pertaining to each color, operation is as follows. Dither noise is generated. A color value is compared with the predetermined cutoff value. When the color value is greater than or equal to the predetermined cutoff value, the dither noise is modified to derive modified color noise. When the color value is less than the predetermined cutoff value, the color value is aliased with other color values below the predetermined cutoff value to derive an aliased color value. Then, the dithered noise is added to the aliased color value to derive the dithered color value, or alternatively, the modified dither noise is added to the nonaliased color value to derive the dithered color value. This method of reduction in the number of color values compliments and enhances the operation of a color recovery filter situated in a decoder. Moreover, the dithered color value is then clamped to ensure that the dithered color value resides within a predetermined color range. Finally, the dithered color value is quantized, such as by truncation, to derive a dithered/quantized color value for storage and memory.

In accordance with another significant feature of the present invention, the dither noise added to each color value can exhibit both positive and negative values. This feature is important in that it minimizes color error in the middle of the visible color distribution and redistributes the error to the extremes where it is less noticeable. Furthermore, a novel algorithm is employed to select the positive and negative numbers so that dither energy within any two dimensional region in the dithered image is minimized.

In accordance with another significant feature of the present invention, the color error is targeted at the very low end of each color value in order to further minimize the visible error. Specifically, aliasing is employed. Color values below a predetermined cutoff value for each color are aliased with other color values below the predetermined cutoff value, so that they are indistinguishable. Experimentation indicates that in dithering implementations which use a different number of bits to represent the different color components, for example, a 3:3:2 RGB color configuration, it is desirable to have a different predetermined cutoff value for each color so that each color component can be independently optimized. Because of the foregoing features, color error within the displayed image is optimally minimized.

In addition to achieving all of the objects set forth previously, the present invention has many other additional advantages, a few of which are set forth hereafter.

An advantage of the present invention is that it can be used for converting a high quality 24-bit color value for a pixel into 12 or 8 bits with a minimization in color error of the ultimately displayed image.

Another advantage of the present invention is that when it is employed in conjunction with color recovery, color error is substantially minimized.

Another advantage of the present invention is that it can be employed with the color recovery technique and filter set forth in the application entitled "Method And Apparatus For Improved Color Recovery In A Computer Graphics System", having Ser. No. 07/859,213 filed on Mar. 27, 1992, now U.S. Pat. No. 5,598,184.

Another advantage of the present invention is that it is simple in design, inexpensive to implement, and is efficient and reliable in operation.

Other objects, features, and advantages of the present invention will become apparent to one skilled in the art upon examination of the following drawings in detailed description.

BRIEF DESCRIPTION OF THE DRAWINGS

The present invention can be better understood with reference to the following drawings.

FIG. 5A is a graph illustrating error of the image displayed on a video display which has been dithered/quantized, processed using a color recovery filter, and processed through a color map, compared with the original high quality image generated by a host processor;

FIG. 5B is a graph illustrating error of the image displayed on a video display which has been dithered/quantized, processed using a color recovery filter, and processed by a novel color map in accordance with the present invention compared with the original high quality image generated by a host processor.

DETAILED DESCRIPTION OF THE PREFERRED EMBODIMENT

Figure 1:
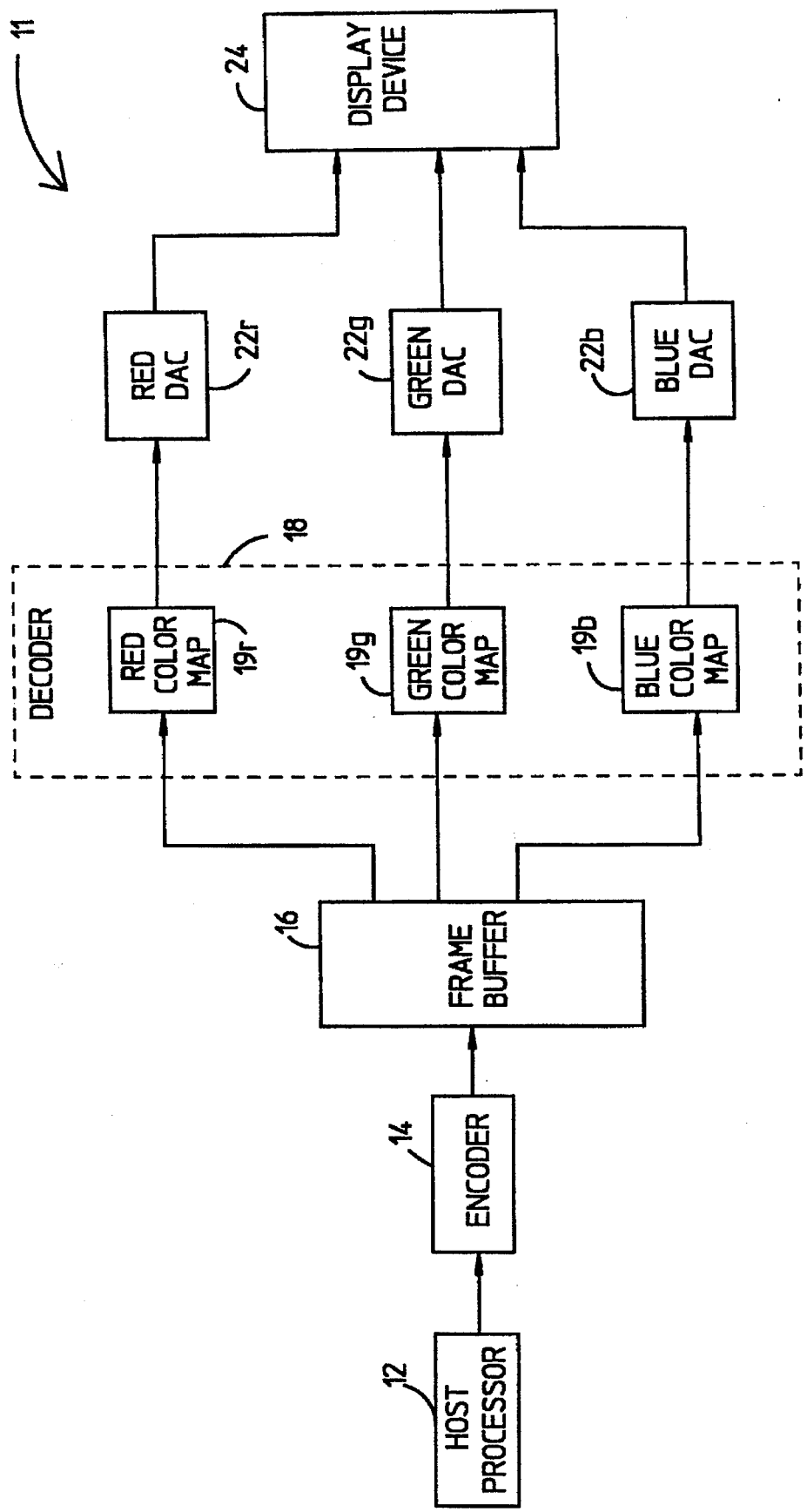
FIG. 1. is a schematic circuit diagram of a conventional graphics pipeline.
Figure 2:
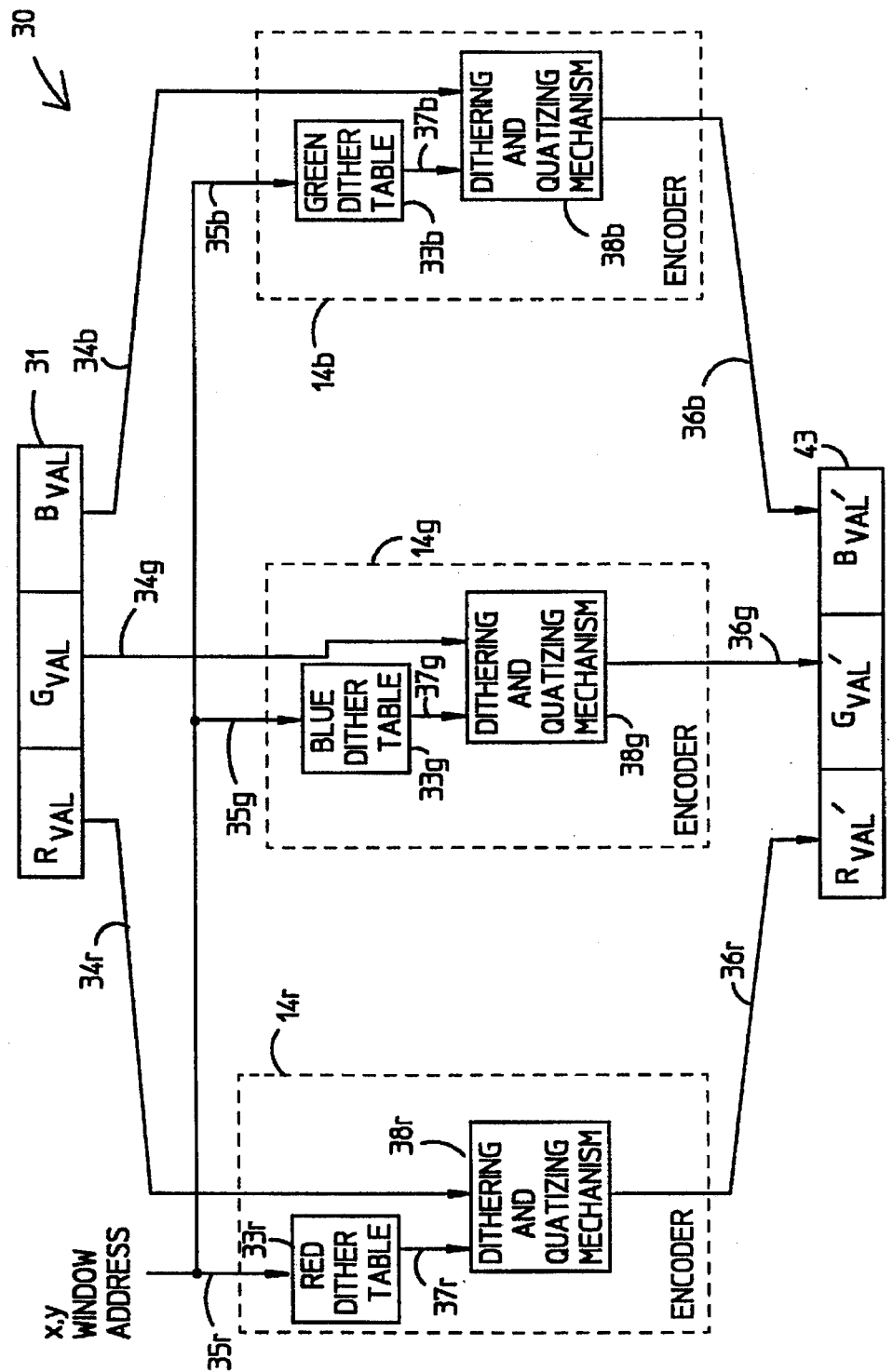
FIG. 2. is a schematic circuit diagram of three parallel encoders in accordance with the present invention wherein a dither table is allocated to each color.

With reference now to the drawings wherein like reference numerals designate corresponding parts throughout the several views, FIG. 2 shows a circuit diagram of a novel dithering system 30 for implementing in the encoder 14 of the graphics pipeline 11 in FIG. 1. The dithering system 30 comprises three parallel encoders 14r, 14g, 14b for dithering red, green, and blue color values within an input data word 31 which corresponds with a pixel and which is generated by the host processor (FIG. 1) in order to derive a smaller dithered and quantized (dithered/quantized) data word 43 for storage in the frame buffer 16 (FIG. 1) or other memory. The input data word 31 can comprise any number of data bits, but for purposes of discussion, it is assumed that 8 data bits defines each color value. The red, green, and blue color values are denoted herein by $R_{val}$, $G_{val}$, $B_{val}$, respectively. Moreover, the dithered/quantized data word 43 comprises any number of total data bits and any number of these bits can define each of the color values $R_{val}'$, $G_{val}' B_{val}'$. For purposes of discussion, it is assumed that the dithered/quantized data word 43 exhibits either a 4:4:4 configuration wherein 4 data bits are allocated to each color or a 3:3:2 configuration wherein 3 data bits are allocated to red, 3 data bits are allocated to green, and 2 data bits are allocated to blue. In either of the aforementioned configurations, the input data word 31 is reduced in size by the novel dithering system 30 to derive the dithered/quantized data word 43.

Each of the encoders 14r, 14g, 14b comprises a respective dither table 33r, 33g, 33b which is addressed by an x,y window address 35r, 35g, 35b on the screen of the display device 24. The red, green, and blue color values 34r, 34g, 34b are bit-spliced from the 24-bit data word 31 and are channeled to the respective encoder 14r, 14g, 14b. The x,y window address 35r, 35g, 35b is used as an index in the dither tables 33r, 33g, 33b for looking up a respective dither noise value 37r, 37g, 37b. The dither noise values 37r, 37g, 37b are mathematically combined with the respective color values 34r, 34g, 34b via a corresponding dithering/quantizing mechanism 38r, 38g, 38b in order to derive respective dithered color values. The dithered color values are then quantized within corresponding mechanisms 38r, 38g, 38b. In the preferred embodiment, the mechanisms 38r, 38g, 38b perform simple truncation and essentially truncate a plurality of least precision bits (lsb positions) from the respective dithered color values in order to derive the dithered/quantized data word 43.

As a result of the separate dither tables 33r, 33g, 33b for red, blue, and green, as shown in FIG. 2, color values can be independently optimized and manipulated to achieve optimum visual results on the display device 24. The independent dither tables 33r, 33g, 33b facilitate edge detection in the color recovery filter set forth in an application entitled "Method And Apparatus For Improved Color Recovery In A Computer Graphics System", having Ser. No.07/859,213, filed on Mar. 27, 1992 (now U.S. Pat. No. 5,598,184), by one of the inventors herein. The preceding concept is more clearly described hereafter. Further, the independent dither tables 33r, 33g, 33b breaks up matting caused by dithering.

The color recovery filter in the foregoing document is situated within the decoder 18 (FIG. 1) of the graphics pipeline 11. As previously mentioned in the Background section, in the process of decoding, the filter essentially invokes an averaging methodology. A weight is assigned to each color value in a region of the filter. The weights around a pixel of interest are averaged together to derive a result which is assigned to the particular pixel of interest. Accordingly, when the filter scans through dithered data from a frame buffer which has come from a flat color field, the data passes through the filter where dithering artifacts are removed and each displayed color value is as close as possible to that in the original flat field. However, when the filter encompasses an edge of a flat color field, the weights accorded to the various color values are redistributed, and the average is obtained in accordance with the redistributed weights. In short, the redistribution of weights involves the following. When the filter encompasses an edge, the weights are based upon which side of the edge the color values are located. The color recovery filter comprises an edge detect circuit corresponding with each of the colors red, green, and blue, for detecting the edges.

Significantly, the inventors herein have determined after extensive experimentation that the use of separate dither tables 33r, 33g, 33b promotes more efficient and reliable edge detection within the edge detection circuits in the color recovery filter. A reason is that the separate dither tables 33r, 33g, 33b provide separate independent dither noise values 37r, 37g, 37b to pixels which are adjacent to an edge. Because the dither noise values are retrieved from different tables, there will be larger disparity in color values from one side of the edge to the other, which disparity enhances the ability to detect the edge with the edge detect circuits.

Figure 3:
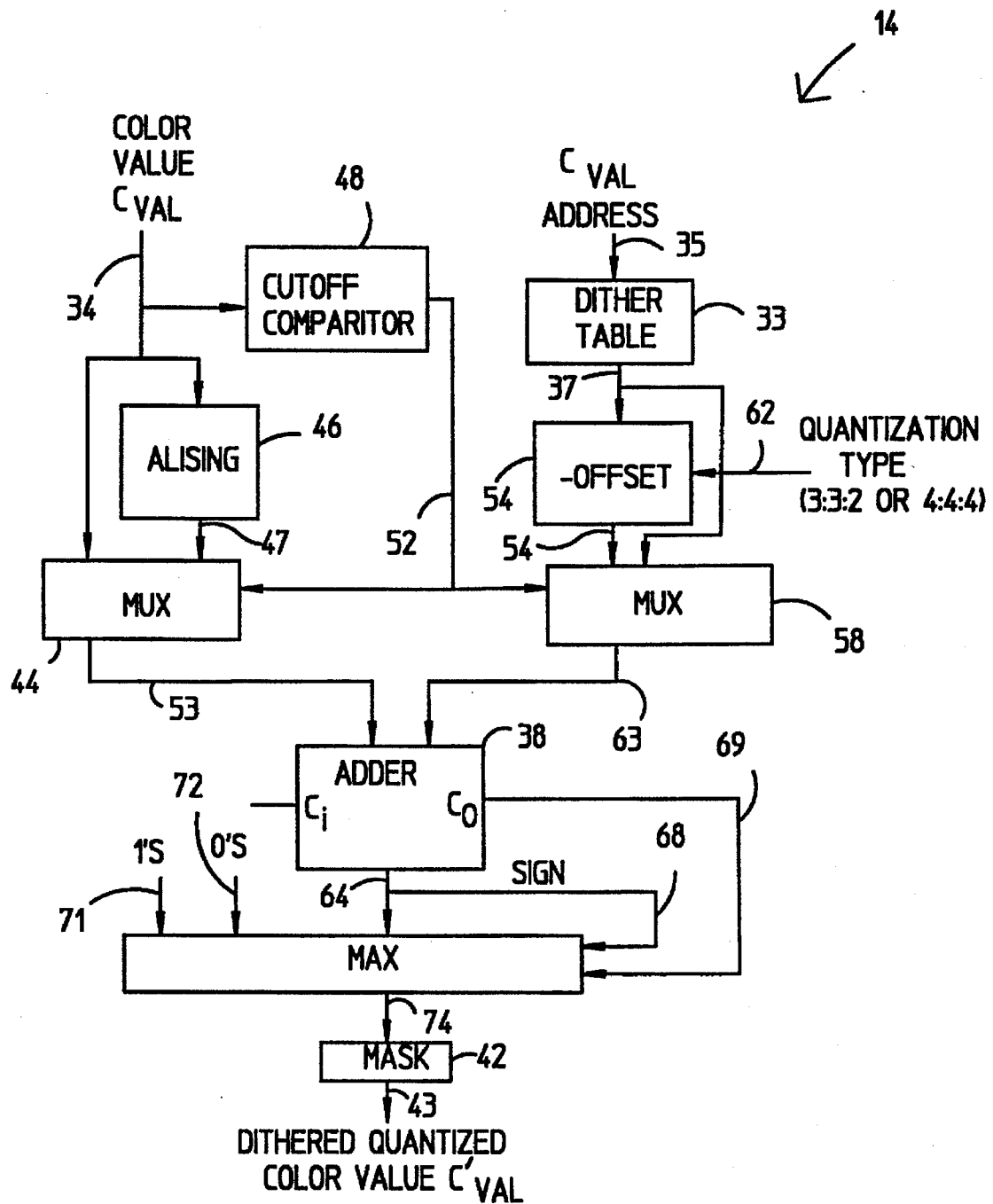
FIG. 3 is a schematic circuit diagram of each encoder of FIG. 2

A specific hardware implementation for each encoder 14 is illustrated in FIG. 3. The encoder 14 of FIG. 3 implements a novel dithering methodology set forth in a flow chart 80 of FIG. 4. The architecture of the encoder 14 in FIG. 3 will be addressed immediately hereinbelow, and then the particular functionality and operation will be described relative to FIG. 4 thereafter. It should further be noted that a specific software implementation for each encoder 14 is set forth in the Appendix of this document. The software implementation can be desirable for obscured window rendering and image creation by a host processor 12.

With reference to FIG. 3, the encoder 14 receives a color value $C_{val}$ ($R_{val}$, $B_{val}$, or $G_{val}$) on connection 34 and the corresponding $C_{val}$ address on connection 35 from the host processor 12 (FIG. 1) or possibly a rasterizer in the encoder 14. The color value $C_{val}$ on connection 34 is fed concurrently to a multiplexer (MUX) 44, to an aliasing mechanism 46, and to a cutoff value comparator 48. The multiplexer 44 enables the color value 34 to be passed through the encoder 14 without hindrance or modification when connection 52 exhibits an appropriate logic state. Otherwise, the logic state of signal 52 causes the multiplexer 44 to forward an aliased color value on connection 47 to the adder 38 so that a dithered/quantized color value $C_{val}'$ on connection 43 can ultimately be generated.

The aliasing mechanism 46, preferably a conventional adder, modifies the color value $C_{val}$ on connection 34 so as to alias the color value $C_{val}$ with other color values. "Aliasing" in the context of this document refers to the process of mapping multiple values to a single value and thus rendering the multiple values indistinguishable from each other. Generally, the aliasing adder 46 divides the color value $C_{val}$ on connection 34 by a constant k to generate a quotient, adds a predetermined boundary value $C_{bound}$ ($R_{bound}$, $B_{bound}$, or $G_{bound}$) to the quotient to produce the aliased color value on connection 47 via preferably a conventional adder, which aliased color value is forwarded to the multiplexer 44.

The cutoff value comparator 48 receives the color value $C_{val}$ on connection 34 and compares the color value $C_{val}$ to a predetermined cutoff value $C_{cutoff}$ ($R_{cutoff}$, $G_{cutoff}$, $B_{cutoff}$). If the color value $C_{val}$ is greater than or equal to the predetermined cutoff value $C_{cutoff}$, then the connection 52 exhibits an appropriate logic state to force the multiplexer 44 to pass the color value $C_{val}$ onto the adder 38 without modification by the aliasing mechanism 46. To the contrary, if the color value $C_{val}$ on connection 34 is less than the predetermined cutoff value $C_{cutoff}$, then the cutoff value comparator 48 drives the connection 52 to the other logic state so that the multiplexer 44 forwards the aliased color value on connection 47 to the adder 38, where it is combined with dither noise $C_{dith}$ on connection 63.

The $C_{val}$ address on connection 35 is input to the dither table 33. The dither table 33 is a conventional read only memory (ROM), a logic network, or some other suitable memory mechanism. The preferred implementation for the dither table 33 is addressed later hereinafter relative to Tables A through C and FIGS. 6A through 6B. In short, the $C_{val}$ address on connection 35 is used as an index to select a corresponding dither noise value $C_{dith}$ within the dither table 33. The dither table 33 outputs the corresponding dither noise value $C_{dith}$ on connection 37, which is concurrently communicated to an offset value adder 56 and a multiplexer 58. The offset value adder 56, preferably a conventional adder, mathematically combines the dither noise value $C_{dith}$ with a predetermined offset value $C_{offset}$ ($R_{offset}$, $G_{offset}$, or $B_{offset}$) and forwards the result to the multiplexer 58, as shown in FIG. 3.

The offset adder 56 receives a quantization type control signal 62, which indicates the system configuration. Recall that in the preferred embodiment, the encoder 14 is operated in either the 3:3:2 or the 4:4:4 configuration. If the 4:4:4 configuration is indicated on the connection 62 by an appropriate logic state, then the offset adder 56 selects a dither noise value $C_{dith}$ from the dither table 33 corresponding to the 4:4:4 configuration, modifies the dither noise value $C_{dith}$ to produce a modified dither noise value $C_{dith}'$, and passes the modified dither noise value $C_{dith}'$ to the multiplexer 58. If the encoder 14 is operating in the 3:3:2 configuration, then the offset adder 56 selects a dither noise value $C_{dith}$ from another set corresponding to the 3:3:2 configuration in the table 33, modifies the dither noise value $C_{dith}$ to produce a modified dither noise value $C_{dith}'$, and passes the modified dither noise value $C_{dith}'$ to the multiplexer 58.

The selection in the multiplexer 58 between the unmodified dither noise value on connection 37 and the modified dither noise value $C_{dith}'$ on connection 54 depends upon the logic state on connection 52 from the cutoff value comparator output 52. If the color value $C_{val}$ on connection 34 is less than the predetermined cutoff value $C_{cutoff}$, then the unmodified dither noise value $C_{dith}$ on connection 37 is forwarded onto the adder 38. However, if the color value $C_{val}$ on connection 34 is greater than or equal to the predetermined cutoff value $C_{cutoff}$, then the modified dither noise on connection 54 is forwarded onto the adder 38 by the multiplexer 58. Said another way, if the color value $C_{val}$ is modified by the aliasing mechanism 46, then the dither noise value $C_{dith}$ from the dither table 33 is not modified by the offset adder 56, and vice versa.

The adder 38 mathematically combines the multiplexer signals on connections 53, 63 from the respective multiplexers 44, 58 and provides a dithered color value on connection 64 to a multiplexer 66. The clamping logic implemented as a multiplexer 66 receives a sign bit 68 from the dithered color value 64 and a carry-out bit 69 from the adder 38 as control signals. The multiplexer 66 also receives, as inputs, a set of logic highs (1 . . . 1) and a set of logic lows (0 . . . 0). The foregoing sets are combined alternately with the dithered color value on connection 64, depending upon the logic states of the sign bit 68 and the carry-out bit 69. If the sign bit 68 indicates that the dithered color value on connection 64 is less than 0, i.e., the dithered color value is negative, then the multiplexer 66 outputs the logic low set 72. If the sign bit 68 indicates a positive number and if the carry-out bit 69 indicates a carry, then the multiplexer 66 outputs the logic high set 71. In all other cases, the multiplexer 66 outputs on output connection 74 the dithered color value which existed on input connection 64.

The multiplexer output on connection 74 is passed to the quantizer 42, which is preferably a simple mask for truncating lower precision bits from the dithered color value on connection 74 in order to generate a dithered/quantized color value $C_{val}'$ on connection 43. In the 3:3:2 configuration, the bit lengths for red, green and blue in the dithered/quantized color value $C_{val}'$ is 3 bits, 3 bits, 2 bits, respectively. In the 4:4:4 configuration, the for red, green, blue in the dithered/quantized color value $C_{val}'$ is 4 bits, 4 bits, 4 bits, respectively.

Figure 4:
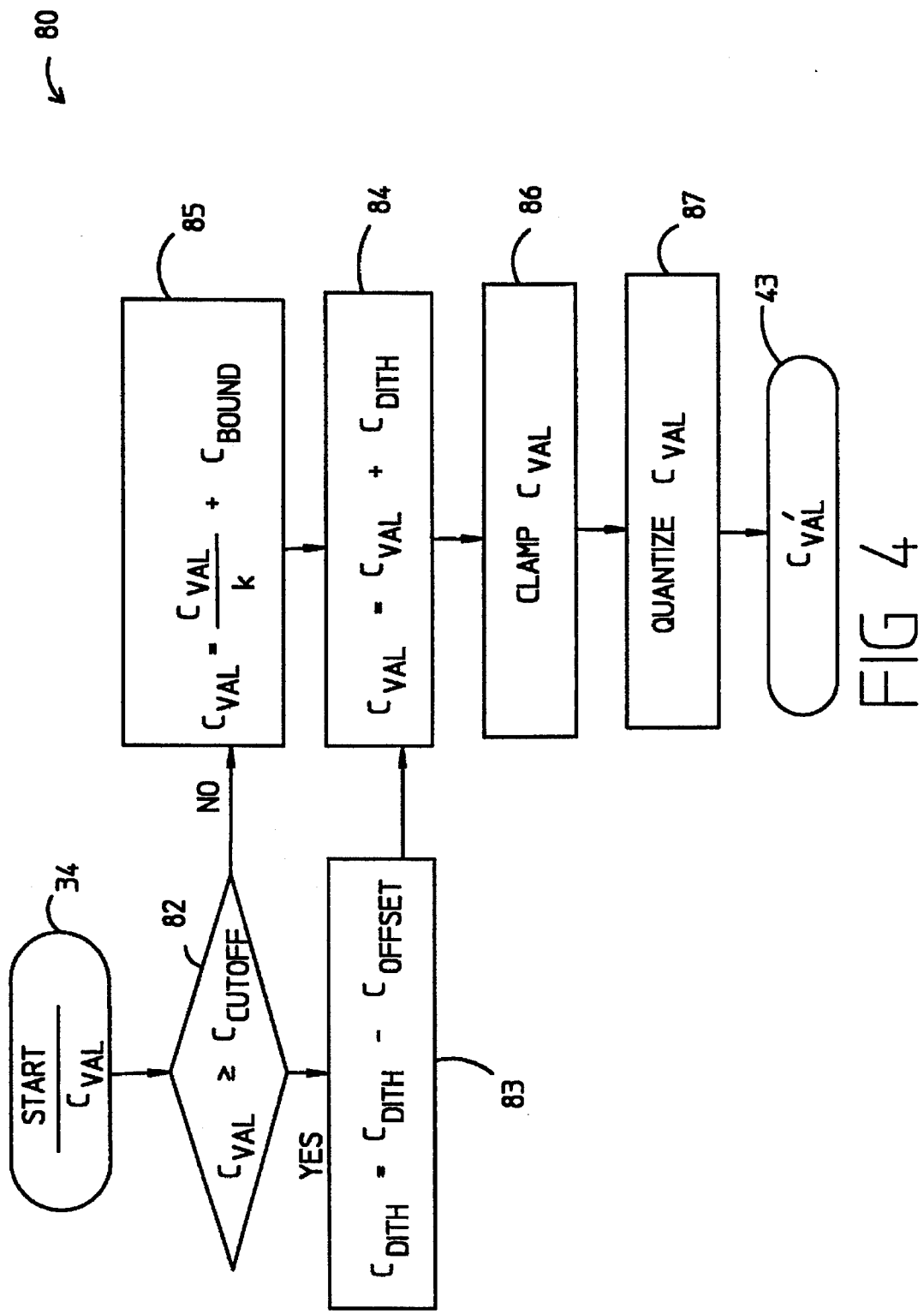
FIG. 4 is flow chart illustrating novel methodology and the operation of the encoder of FIG. 3 in accordance with the present invention.

The overall operation of the encoder 14 of FIG. 3 will now be described with respect to the architecture of FIG. 3 as well as a flow chart in FIG. 4. Essentially, the flow chart of FIG. 4 sets forth the novel methodology 80 in accordance with the present invention. As indicated at a flow chart block 82, the color value $C_{val}$ on connection 34 is initially compared to the predetermined cutoff value $X_{cutoff}$ in the cutoff comparator 48.

When the color value 34 is greater than or equal to the cutoff value $X_{cutoff}$, then the predetermined offset value $-R_{offset}$ is mathematically combined with the dither noise value $C_{dith}$ on connection 54 via the offset adder 56 to derive the modified dither noise value $C_{dith}'$ On connection 54, as indicated in the flow chart block 83. Next, as indicated by the flow chart block 84, the modified dither noise value $C_{dith}'$ 54 is mathematically combined with data on connection 53 to derive a dithered color value 64.

When the color value $C_{val}$ on connection 34 is less than the predetermined cutoff value $C_{cutoff}$, then the color value $C_{val}$ on connection 34 undergoes an aliasing process, as indicated in the flow chart block 85. In the aliasing process, the color value $C_{val}$ is first divided by a constant k, such as 2, to derive a quotient, and then a bound value $C_{bound}$, preferably an integer, is added to the quotient in order to derive an aliased color value on connection 47. The aliased color value on connection 47 is then mathematically combined with the unmodified dither noise value $C_{dith}$ on connection 37 via the adder 38, as indicated in the flow chart block 84.

Next, as indicated in the flow chart block 86, the dithered color value 4 is clamped. "Clamping" means that the dithered color value is compared to values within a predetermined color range to ensure that it falls within the predetermined color range. In the preferred embodiment, the predetermined color range is 0 to 255. Anything below 0 is set to 0 and anything above 255 is set at 255. The clamping is accomplished by the multiplexer 66, which receives the logic high set on connection 71 and the logic low set on connection 72 as well as the control signals from the sign bit on connection 68 and the carry out bit on connection 69. Whenever the sign bit on connection 68 is set, this means that the result is a negative number and should be clamped to 0. Moreover, whenever the carry out bit on connection 69 is set, this means that the result should be clamped to 255.

The dithered color value on connection 74 is now quantized, as indicated in the flow chart block 87. Preferably, quantization is performed using a masking process where least precision bits are truncated. This masking process is performed by the mask 42. Hence, a dithered/quantized color value $C_{val}'$ on connection 43 is achieved.

Preferred Dither Noise Values

The dither noise values in the dither tables 33r, 33g, 33b of the preferred embodiment are set forth hereafter in respective Tables A, B, and C. In the Tables A, B, and C, the values x, y are the window address on connections 35r, 35g, 35b in FIG. 3. Each set of values x, y denotes a spatial position in a window on the screen of the display device 24 (FIG. 1) or memory. The value y0 designates a scan line, and the values x3 to x0 represent positions on the scan line. Moreover, the 2's complement representation of the dither noise value is stored in the respective dither table. A decimal value for the 2's compliment is also provided for clarification and better understanding.

TABLE A

Red Dither Noise Values

| y0 | x3 | x2 | x1 | x0 | Value | 2's Complement | | | | |
|---|---|---|---|---|---|---|---|---|---|---|
| | | | | | | RB4 | RB3 | RB2 | RB1 | RB0 |
| 0 | 0 | 0 | 0 | 0 | −16 | 1 | 0 | 0 | 0 | 0 |
| 0 | 0 | 0 | 0 | 1 | 4 | 0 | 0 | 1 | 0 | 0 |
| 0 | 0 | 0 | 1 | 0 | −1 | 1 | 1 | 1 | 1 | 1 |
| 0 | 0 | 0 | 1 | 1 | 11 | 0 | 1 | 0 | 1 | 1 |
| 0 | 0 | 1 | 0 | 0 | −14 | 1 | 0 | 0 | 1 | 0 |
| 0 | 0 | 1 | 0 | 1 | 6 | 0 | 0 | 1 | 1 | 0 |
| 0 | 0 | 1 | 1 | 0 | −3 | 1 | 1 | 1 | 0 | 1 |
| 0 | 0 | 1 | 1 | 1 | 9 | 0 | 1 | 0 | 0 | 1 |
| 0 | 1 | 0 | 0 | 0 | −15 | 1 | 0 | 0 | 0 | 1 |
| 0 | 1 | 0 | 0 | 1 | 5 | 0 | 0 | 1 | 0 | 1 |
| 0 | 1 | 0 | 1 | 0 | −2 | 1 | 1 | 1 | 1 | 0 |
| 0 | 1 | 0 | 1 | 1 | 10 | 0 | 1 | 0 | 1 | 0 |
| 0 | 1 | 1 | 0 | 0 | −13 | 1 | 0 | 0 | 1 | 1 |
| 0 | 1 | 1 | 0 | 1 | 7 | 0 | 0 | 1 | 1 | 1 |
| 0 | 1 | 1 | 1 | 0 | −4 | 1 | 1 | 1 | 0 | 0 |
| 0 | 1 | 1 | 1 | 1 | 8 | 0 | 1 | 0 | 0 | 0 |
| 1 | 0 | 0 | 0 | 0 | 15 | 0 | 1 | 1 | 1 | 1 |
| 1 | 0 | 0 | 0 | 1 | −5 | 1 | 1 | 0 | 1 | 1 |
| 1 | 0 | 0 | 1 | 0 | 0 | 0 | 0 | 0 | 0 | 0 |
| 1 | 0 | 0 | 1 | 1 | −12 | 1 | 0 | 1 | 0 | 0 |
| 1 | 0 | 1 | 0 | 0 | 13 | 0 | 1 | 1 | 0 | 1 |
| 1 | 0 | 1 | 0 | 1 | −7 | 1 | 1 | 0 | 0 | 1 |
| 1 | 0 | 1 | 1 | 0 | 2 | 0 | 0 | 0 | 1 | 0 |
| 1 | 0 | 1 | 1 | 1 | −10 | 1 | 0 | 1 | 1 | 0 |

TABLE A-continued

Red Dither Noise Values

| y0 | x3 | x2 | x1 | x0 | Value | 2's Complement | | | | |
|---|---|---|---|---|---|---|---|---|---|---|
| | | | | | | RB4 | RB3 | RB2 | RB1 | RB0 |
| 1 | 1 | 0 | 0 | 0 | 14 | 0 | 1 | 1 | 1 | 0 |
| 1 | 1 | 0 | 0 | 1 | −6 | 1 | 1 | 0 | 1 | 0 |
| 1 | 1 | 0 | 1 | 0 | 1 | 0 | 0 | 0 | 0 | 1 |
| 1 | 1 | 0 | 1 | 1 | −11 | 1 | 0 | 1 | 0 | 1 |
| 1 | 1 | 1 | 0 | 0 | 12 | 0 | 1 | 1 | 0 | 0 |
| 1 | 1 | 1 | 0 | 1 | −8 | 1 | 1 | 0 | 0 | 0 |
| 1 | 1 | 1 | 1 | 0 | 3 | 0 | 0 | 0 | 1 | 1 |
| 1 | 1 | 1 | 1 | 1 | −9 | 1 | 0 | 1 | 1 | 1 |

TABLE B

Green Dither Noise Values

| y0 | x3 | x2 | x1 | x0 | Value | 2's Complement | | | | |
|---|---|---|---|---|---|---|---|---|---|---|
| | | | | | | GB4 | GB3 | GB2 | GB1 | GB0 |
| 0 | 0 | 0 | 0 | 0 | 11 | 0 | 1 | 0 | 1 | 1 |
| 0 | 0 | 0 | 0 | 1 | −15 | 1 | 0 | 0 | 0 | 1 |
| 0 | 0 | 0 | 1 | 0 | 7 | 0 | 0 | 1 | 1 | 1 |
| 0 | 0 | 0 | 1 | 1 | −3 | 1 | 1 | 1 | 0 | 1 |
| 0 | 0 | 1 | 0 | 0 | 8 | 0 | 1 | 0 | 0 | 0 |
| 0 | 0 | 1 | 0 | 1 | −14 | 1 | 0 | 0 | 1 | 0 |
| 0 | 0 | 1 | 1 | 0 | 4 | 0 | 0 | 1 | 0 | 0 |
| 0 | 0 | 1 | 1 | 1 | −2 | 1 | 1 | 1 | 1 | 0 |
| 0 | 1 | 0 | 0 | 0 | 10 | 0 | 1 | 0 | 1 | 0 |
| 0 | 1 | 0 | 0 | 1 | −16 | 1 | 0 | 0 | 0 | 0 |
| 0 | 1 | 0 | 1 | 0 | 6 | 0 | 0 | 1 | 1 | 0 |
| 0 | 1 | 0 | 1 | 1 | −4 | 1 | 1 | 1 | 0 | 0 |
| 0 | 1 | 1 | 0 | 0 | 9 | 0 | 1 | 0 | 0 | 1 |
| 0 | 1 | 1 | 0 | 1 | −13 | 1 | 0 | 0 | 1 | 1 |
| 0 | 1 | 1 | 1 | 0 | 5 | 0 | 0 | 1 | 0 | 1 |
| 0 | 1 | 1 | 1 | 1 | −1 | 1 | 1 | 1 | 1 | 1 |
| 1 | 0 | 0 | 0 | 0 | −12 | 1 | 0 | 1 | 0 | 0 |
| 1 | 0 | 0 | 0 | 1 | 14 | 0 | 1 | 1 | 1 | 0 |
| 1 | 0 | 0 | 1 | 0 | −8 | 1 | 1 | 0 | 0 | 0 |
| 1 | 0 | 0 | 1 | 1 | 2 | 0 | 0 | 0 | 1 | 0 |
| 1 | 0 | 1 | 0 | 0 | −9 | 1 | 0 | 1 | 1 | 1 |
| 1 | 0 | 1 | 0 | 1 | 13 | 0 | 1 | 1 | 0 | 1 |
| 1 | 0 | 1 | 1 | 0 | −5 | 1 | 1 | 0 | 1 | 1 |
| 1 | 0 | 1 | 1 | 1 | 1 | 0 | 0 | 0 | 0 | 1 |
| 1 | 1 | 0 | 0 | 0 | −11 | 1 | 0 | 1 | 0 | 1 |
| 1 | 1 | 0 | 0 | 1 | 15 | 0 | 1 | 1 | 1 | 1 |
| 1 | 1 | 0 | 1 | 0 | −7 | 1 | 1 | 0 | 0 | 1 |
| 1 | 1 | 0 | 1 | 1 | 3 | 0 | 0 | 0 | 1 | 1 |
| 1 | 1 | 1 | 0 | 0 | −10 | 1 | 0 | 1 | 1 | 0 |
| 1 | 1 | 1 | 0 | 1 | 12 | 0 | 1 | 1 | 0 | 0 |
| 1 | 1 | 1 | 1 | 0 | −6 | 1 | 1 | 0 | 1 | 0 |
| 1 | 1 | 1 | 1 | 1 | 0 | 0 | 0 | 0 | 0 | 0 |

TABLE C

Blue Dither Noise Values

| y0 | x3 | x2 | x1 | x0 | Value | 2's Complement | | | | |
|---|---|---|---|---|---|---|---|---|---|---|
| | | | | | | BB4 | BB3 | BB2 | BB1 | BB0 |
| 0 | 0 | 0 | 0 | 0 | −3 | 1 | 1 | 1 | 0 | 1 |
| 0 | 0 | 0 | 0 | 0 | 9 | 0 | 1 | 0 | 0 | 1 |
| 0 | 0 | 0 | 1 | 0 | −13 | 1 | 0 | 0 | 1 | 1 |
| 0 | 0 | 0 | 1 | 1 | 7 | 0 | 0 | 1 | 1 | 1 |
| 0 | 0 | 1 | 0 | 0 | −1 | 1 | 1 | 1 | 1 | 1 |
| 0 | 0 | 1 | 0 | 1 | 11 | 0 | 1 | 0 | 1 | 1 |
| 0 | 0 | 1 | 1 | 0 | −15 | 1 | 0 | 0 | 0 | 1 |
| 0 | 0 | 1 | 1 | 1 | 5 | 0 | 0 | 1 | 0 | 1 |
| 0 | 1 | 0 | 0 | 0 | −4 | 1 | 1 | 1 | 0 | 0 |
| 0 | 1 | 0 | 0 | 1 | 8 | 0 | 1 | 0 | 0 | 0 |

TABLE C-continued

Blue Dither Noise Values

| y0 | x3 | x2 | x1 | x0 | Value | 2's Complement | | | | |
|----|----|----|----|----|-------|-----|-----|-----|-----|-----|
|    |    |    |    |    |       | BB4 | BB3 | BB2 | BB1 | BB0 |
| 0 | 1 | 0 | 1 | 0 | −14 | 1 | 0 | 0 | 1 | 0 |
| 0 | 1 | 0 | 1 | 1 | 6   | 0 | 0 | 1 | 1 | 0 |
| 0 | 1 | 1 | 0 | 0 | −2  | 1 | 1 | 1 | 1 | 0 |
| 0 | 1 | 1 | 0 | 1 | 10  | 0 | 1 | 0 | 1 | 0 |
| 0 | 1 | 1 | 1 | 0 | −16 | 1 | 0 | 0 | 0 | 0 |
| 0 | 1 | 1 | 1 | 1 | 4   | 0 | 0 | 1 | 0 | 0 |
| 1 | 0 | 0 | 0 | 0 | 2   | 0 | 0 | 0 | 1 | 0 |
| 1 | 0 | 0 | 0 | 1 | −10 | 1 | 0 | 1 | 1 | 0 |
| 1 | 0 | 0 | 1 | 0 | 12  | 0 | 1 | 1 | 0 | 0 |
| 1 | 0 | 0 | 1 | 1 | −8  | 1 | 1 | 0 | 0 | 0 |
| 1 | 0 | 1 | 0 | 0 | 0   | 0 | 0 | 0 | 0 | 0 |
| 1 | 0 | 1 | 0 | 1 | −12 | 1 | 0 | 1 | 0 | 0 |
| 1 | 0 | 1 | 1 | 0 | 14  | 0 | 1 | 1 | 1 | 0 |
| 1 | 0 | 1 | 1 | 1 | −6  | 1 | 1 | 0 | 1 | 0 |
| 1 | 1 | 0 | 0 | 0 | 3   | 0 | 0 | 0 | 1 | 1 |
| 1 | 1 | 0 | 0 | 1 | −9  | 1 | 0 | 1 | 1 | 1 |
| 1 | 1 | 0 | 1 | 0 | 13  | 0 | 1 | 1 | 0 | 1 |
| 1 | 1 | 0 | 1 | 1 | −7  | 1 | 1 | 0 | 0 | 1 |
| 1 | 1 | 1 | 0 | 0 | 1   | 0 | 0 | 0 | 0 | 1 |
| 1 | 1 | 1 | 0 | 1 | −11 | 1 | 0 | 1 | 0 | 1 |
| 1 | 1 | 1 | 1 | 0 | 15  | 0 | 1 | 1 | 1 | 1 |
| 1 | 1 | 1 | 1 | 1 | −5  | 1 | 1 | 0 | 1 | 1 |

As is apparent from the dither noise values in Tables A, B, and C, both positive and negative dither noise values (−16 to +15) are mathematically combined with the color values $R_{val}$, $B_{val}$, and $B_{val}$. This is a feature of the present invention. This feature redistributes the color error to the extremes of the visible color spectrum where it is less noticeable.

The methodology for generating the dither noise values is also worth noting. The values are set so that contiguous vertical pixels, that is, adjacent pixels on adjacent scan lines, when summed together, equal −1(0 would have been optimum, but not possible as the values range from −16 to +15). For instance, in Table B, when the dither noise value (i.e., 11) corresponding with position 00000 is added to the dither noise value (i.e., −12) corresponding with position 10000, the result is −1. This feature effectively minimizes the dither energy in any given two dimensional region and thereby further enhances the image on the display device 24 (FIG. 1) by reducing banding and other adverse effects.

Preferred $C_{cutoff}$, $C_{offset}$, $C_{bound}$ Parameters

In the preferred embodiment, the constant k eliminates (k−1)/k of the color values below the predetermined $C_{cutoff}$. Moreover, $C_{bound}$ and $C_{offset}$ together insure that there is a gradual continuous change in color around $C_{cutoff}$ as well as below $C_{cutoff}$ (in the aliased region). In essence, the $C_{cutoff}$, $C_{offset}$, $C_{bound}$ parameters together with the negative dither table values optimize placement of error across the color range. The error is shown in FIGS. 5A and 5B, and will be further described in detail hereinafter.

The encoders 14r, 14g, 14b for the respective colors red, green, and blue, preferably implement the parameters $C_{cutoff}$, $C_{offset}$, $C_{bound}$ set forth in tables D and E hereafter.

TABLE D

3:3:2 Configuration

|              | RED | GREEN | BLUE |
|--------------|-----|-------|------|
| $C_{cutoff}$ | 48  | 48    | 112  |
| $C_{bound}$  | 8   | 8     | 24   |
| $C_{offset}$ | 16  | 16    | 32   |

TABLE E

4:4:4 Configuration

|              | RED | GREEN | BLUE |
|--------------|-----|-------|------|
| $C_{cutoff}$ | 32  | 32    | 32   |
| $C_{bound}$  | 8   | 8     | 8    |
| $C_{offset}$ | 8   | 8     | 8    |

In accordance with another significant feature of the present invention, each of the color values $R_{val}$, $G_{val}$, and $B_{val}$ is independently and optimally dithered by the parameters set forth in Tables D and E in combination with the positive and negative dither noise values set forth in Tables A, B, and C. This feature permits independent manipulation and optimization for each color seen on the display device 24 (FIG. 1).

Color Error

FIG. 5A illustrates the aforementioned concepts involving use of the $C_{cutoff}$, $C_{offset}$, $C_{bound}$ parameters and positive/negative dither noise values. FIG. 5A shows an example of the error between an 8-bit color value (reference number 34 in FIG. 3) for a pixel and the ultimate dithered/quantized 3-bit color value passed through the color recovery filter for red or green in the 3:3:2 configuration with the parameters of Table D hereinbefore. This error is measured in a constant color region. As shown in FIG. 5A, the displayed color values below the $C_{cutoff}$ parameter are characterized by error, whereas those color values above the $C_{cutoff}$ parameter are of the same high quality as the 8-bit color value. The error starts at 0 (intensity levels) and increases linearly to 15 when the displayed color value is 15. Afterwards, the error alternates between 1 and 0 on each successive intensity level until reaching $C_{cutoff}$ at 48. The foregoing region is called the aliasing region. For example, the value 21 gets mapped to 20, and therefore becomes indistinguishable from 20, and thus has an error of 1.

Then, after $C_{cutoff}$, the error remains is 0. In this example, ultimately, 32 of the possible 256 color intensities defined by the 3-bit color value are in error, while 224 color intensities defined by 3-bit color value are virtually identical to their 8-bit color value counterpart. Moreover, it should be noted that the larger increase in error around zero is attributable to use of negative dither values.

In order to help spread out and redistribute the error a little better than that shown in FIG. 5A, the corresponding color map 19 (FIG. 1) is modified to alias color values below the color level where maximum error occurs to a nonzero value. In the example of FIG. 5A and the preferred embodiment, color values below 15 are aliased to a point between 0 and 15, preferably at 12. With this color map configuration, the error is redistributed as illustrated in FIG. 5B. As shown in FIG. 5B, more error is shifted toward zero, where it is less perceptible by the human eye, and the error is minimized toward the more perceptible color region. In this example, error is 12 at 0, then decreases linearly to 0 at 12, then increases linearly to 3 at 15, and then alternates between 1 and 0 on each successive intensity level until reaching $C_{cutoff}$ at 48.

Preferred Dither Tables

Figure 6A:
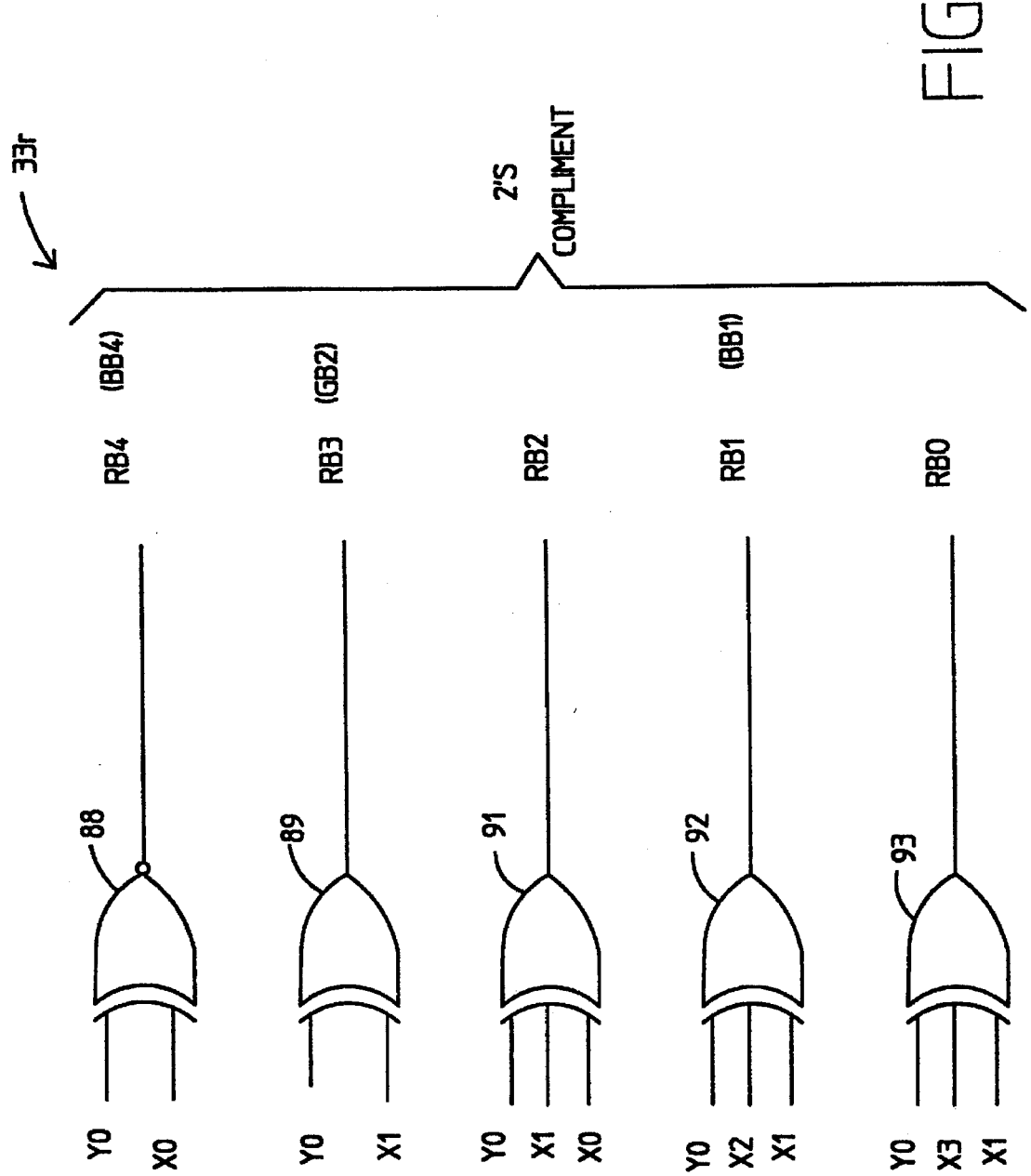
FIGS. 6A through 6C are schematic circuit diagrams of each dither table of FIG. 3 in accordance with the present invention.
Figure 6B:
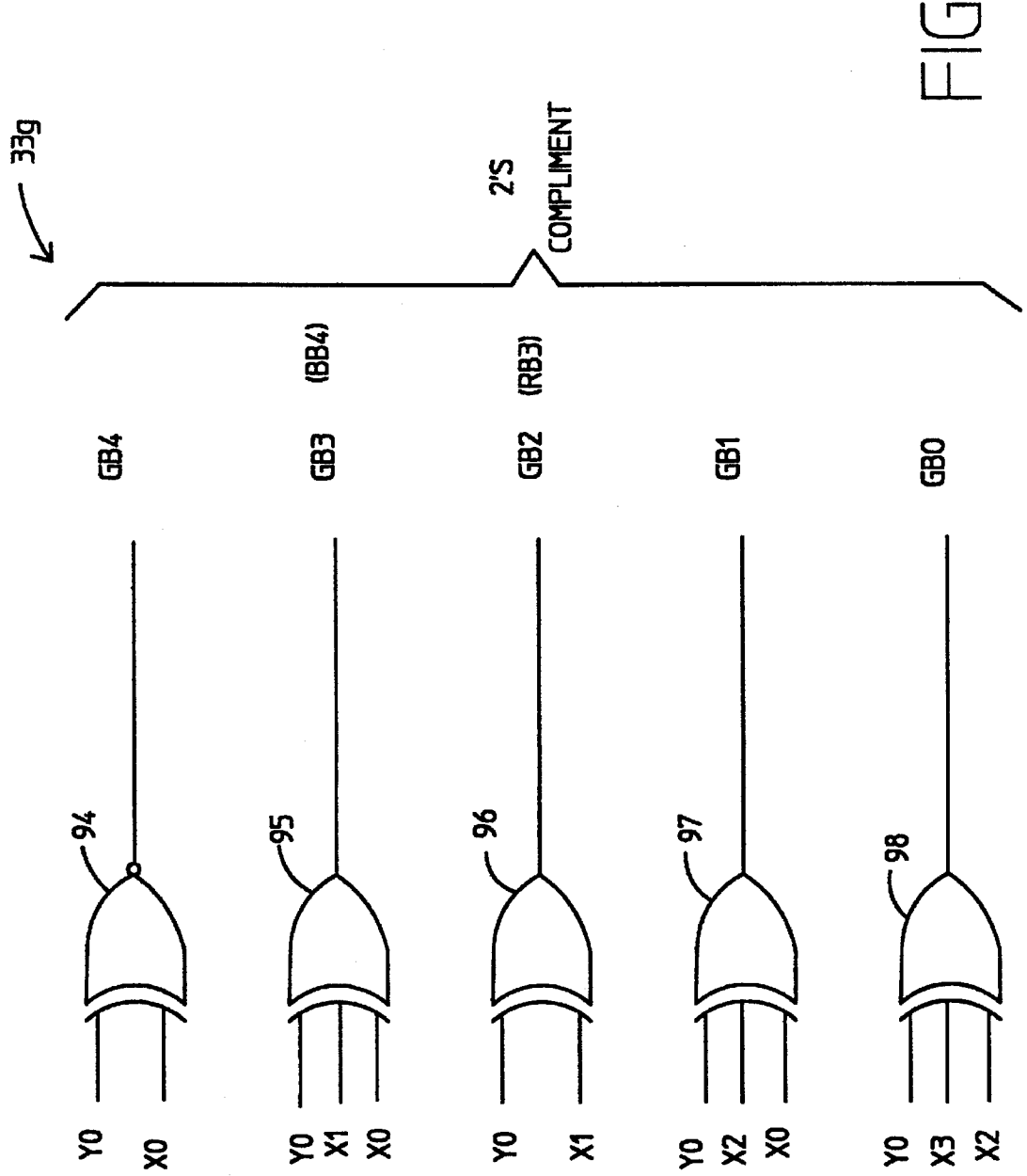
Figure 6C:
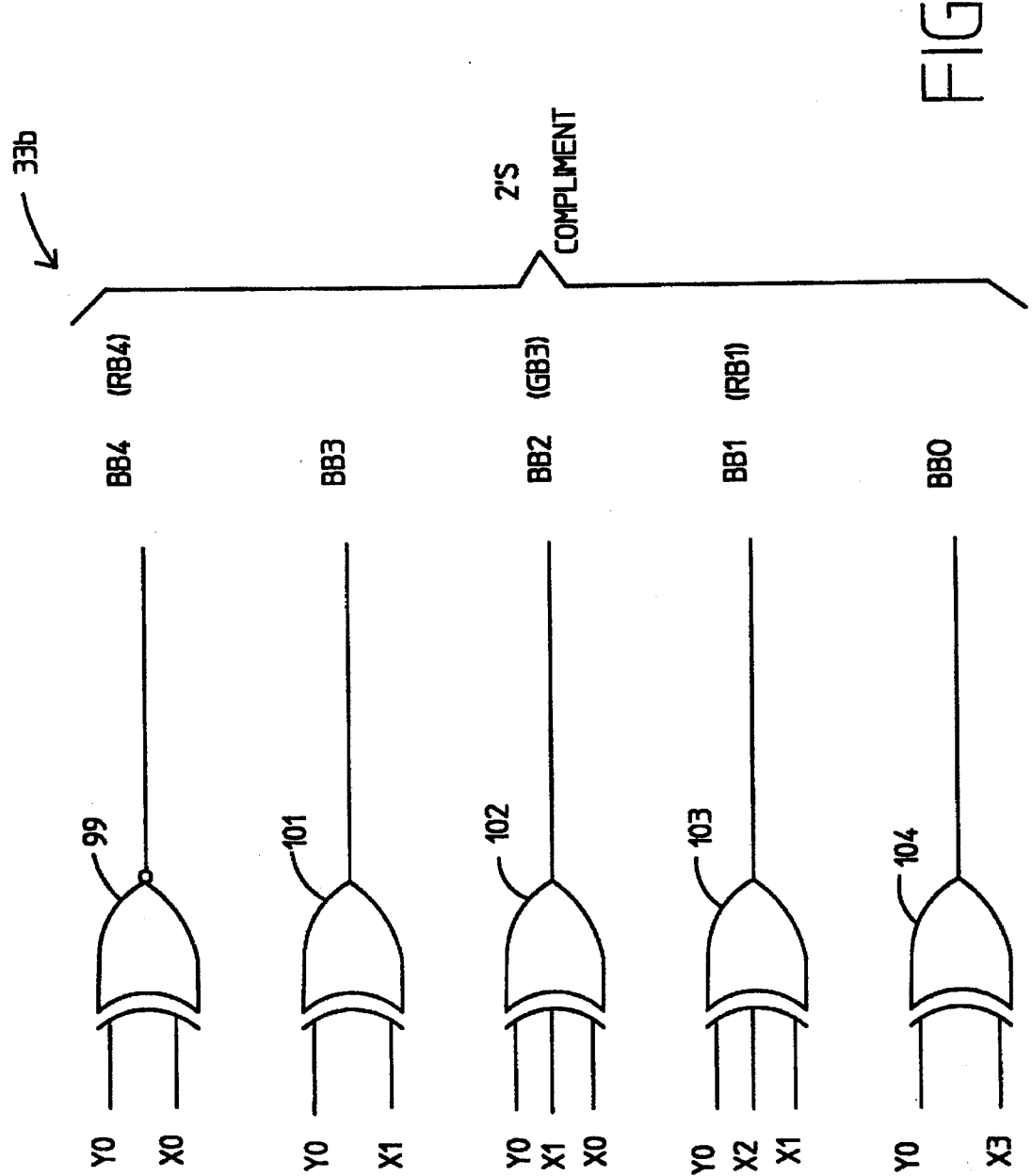

The preferred implementation of the dither tables 33r, 33g, 33b is set forth in respective FIGS. 6A, 6B, 6C. In the preferred embodiment, a set of simple logic gates is utilized to encode the dither noise values set forth in Tables A, B, C hereinbefore. The logic gates use much less space than a conventional ROM, are less expensive than a ROM, and are faster than a ROM.

As shown in FIG. 6A, the dither table 33r comprises parallel logic gates 88 through 93, particularly, XNOR logic gate 88 and XOR logic gates 89–93. The values y0, x3, x2, x1, x0 are input to the logic gates 88 through 93 as shown in FIG. 6A to generate a 2's compliment for red, i.e., the byte RB4, RB3, RB2, RB1, RB0.

As shown in FIG. 6B, the dither table 33g comprises parallel logic gates 94 through 98, particularly, XOR logic gates 94, 96 and XNOR logic gates 95, 97, 98. The values y0, x3, x2, x1, x0 are input to the logic gates 94 through 98 as shown to generate a 2's compliment for green, i.e., the byte GB4, GB3, GB2, GB1, GB0. As shown in FIG. 6C, the dither table 33b comprises parallel logic gates 99 through 104, particularly, XNOR logic gates 99, 101, 102,104 and XOR logic gate 103. The values y0, x3, x2, x1, x0 are input to the logic gates 99 through 104 as shown in FIG. 6C to generate a 2's compliment for blue, i.e., the byte BB4, BB3, BB2, BB1, BB0.

As further illustrated in FIGS. 6A through 6C, there is a certain redundancy in the logic, which permits an even further simplification of the logic. For instance, as shown in FIG. 6C, BB4 will always be in the same logic state as RB4, and therefore, either one of logic gates 99 or 88 could be eliminated.

It would be obvious to those skilled in the art that many variations and modifications may be made to the preferred embodiment without substantially departing from the principals of the present invention. All such variations and modifications are intended to be included herein within the scope of the present invention, as set forth in the following claims.

APPENDIX
Software Implementation Of Encoders

```
static int    dither_arrayR[32] =
              {-16,4,-1,11,-14,6,-3,9,-15,5,-2,10,-13,7,-4,8,
              15,-5,0,-12,13,-7,3,-10,14,-6,1,-11,12,-8,3,-9};
static int    dither_arrayG[32] =
              {11,-15,7,-3,8,-14,4,-2,10,-16,6,-4,9,-,13,5,-1,
              -12,14,-8,2,-9,13,-5,1,-11,15,-7,3,-10,12,-6,0};
static int    dither_arrayB[32] =
              {-3,9,-13,7,-1,11,-15,5,-4,8,-14,6,-2,10,-16,4,
              2,-10,12,-8,0,-12,14,-6,3,-9,13,-7,1,-11,15,-5{;
/*************************Dither and encode the Pixel*************************/
/******************************into 3:3:2 format*****************************/
int    dither_pixel (x,y,temp_red,temp_green,temp_blue)
int    x,y,temp_red,temp_green,temp_blue;
{
       int encoded_color;
       int dither_index;
       int temp_ditherR, temp_ditherG, temp-ditherB;
       dither_index = dither_add(x,y);
       temp_ditherR = dither_arrayR[dither_index];
       if (temp_red !=0)  {
              if (temp_red > 48)  {
                     temp_red = temp_red - 16 + temp_ditherR;
              }
              else {     /* red <= 48*/
                     temp_red = ((temp_red>>1) + 8) + temp_ditherR;
              }
       }     /*End of end != 0 */
       if (temp_red > 225) temp_red = 255;
       if (temp_red < 0)   temp_red = 0;
       temp_ditherG = dither_arrayG[dither_index];
       if (temp_green != 0) {
              if (temp_green > 48)  {
                     temp_green = temp+green - 16 + temp_ditherG;
              }
              else {     /* green <= 48 */
                     temp_green = ((temp_green>>1) + 8) + temp_ditherG;
              }
       }     /* End of end != 0 */
       if (temp_green > 255) temp_green = 255;
       if (temp_green < 0) temp_green = 0;
       temp_ditherB = dither_arrayB[dither_index]; << 1;
       if (temp_blue != 0) {
              if (temp_blue > 112)  {
                     temp_blue = temp_blue - 32 + temp_ditherB;
              }
              else {     /*blue <= 112 */
                     temp_blue = ((temp_13 blue>> 1) + 24) + temp_ditherB;
```

-continued

APPENDIX
Software Implementation Of Encoders

```
        }
    }   /* End of end != 0 */
    if (temp_blue > 225) temp_blue = 255;
    if (temp_blue < 0) temp_blue = 0;
    encoded_color = temp_red & 0xE0 | ((temp_green & 0xE0) >> 3)
                | ((temp_blue & 0xC0) >> 6);
    return (encoded_color);
}
/*****************************address for dither***************************/
int dither_add(current_x,current_y)
int    current_x,current_y;
{
    int    out_address;
    out_address = (current_x & 0x0F) + ((current_y & 0x01) <<
4);
    return(out_address);
}
****************************************************************************
END APPENDIX
```

Wherefore, the following is claimed:

1. A system for dithering and quantizing image data, comprising:

dithering means for providing a dither noise value;

comparator means for comparing a color value corresponding with the image data with a predetermined cutoff value;

aliasing means for aliasing the color value with other color values below said predetermined cutoff value when the color value is less than said predetermined cutoff value to derive an aliased color value;

offset means for modifying the dither noise value when the color value is greater than said predetermined cutoff value to derive a modified dither noise value;

adder means for generating a dithered color value, said adder means for mathematically combining said dither noise value with said aliased color value and for mathematically combining said modified dither noise value with said color value;

clamping means for insuring that said dithered color value resides within a predetermined color range; and quantizing means for quantizing said dithered color value to derive a dithered and quantized color value for storage in memory.

2. The system of claim 1, wherein said aliasing means comprises:

means for dividing said color value by a constant to derive a quotient; and means for adding an integer number to said quotient.

3. The system of claim 2, wherein said constant is two.

4. The system of claim 1, wherein said color range comprises 256 different color intensities.

5. The system of claim 1, wherein said quantizing means further comprises a means for truncating said dithered color value to derive said dithered and quantized color value.

6. The system of claim 1, wherein said dithering means comprises a dither table.

7. The system of claim 1, wherein said dithering means comprises logic for generating said dither noise.

8. The system of claim 1, wherein said dither noise is a negative number.

9. The system of claim 1, wherein said dithering means includes a dither table corresponding with each of several colors, each said dither table having dither noise values corresponding with its respective color.

10. A method for dithering and quantizing image data, comprising the steps of:

generating dither noise;

comparing a color value with a predetermined cutoff value;

when the color value is greater than said predetermined cutoff value, modifying said dither noise to derive modified color noise;

when the color value is less than said predetermined cutoff value, aliasing the color value with other color values below said predetermined cutoff value to derive an aliased color value;

when the color value is greater than said predetermined cutoff value, mathematically combining said modified dither noise with said color value to derive a dithered color value;

when the color value is less than said predetermined cutoff value, mathematically combining said dither noise with said aliased color value to derive said dithered color value;

clamping said dithered color value to insure that said dithered color value resides within a predetermined color range; and quantizing said dithered color value to derive a dithered and quantized color value for storage in memory.

11. The method of claim 10, further comprising the step of averaging said dithered and quantized color value with other dithered and quantized color values corresponding to adjacent pixels to derive a decoded color value for display on a display device.

12. The method of claim 10, wherein the dither noise is a negative number.

13. The method of claim 10, wherein the step of aliasing further comprises the steps of:

dividing said color value by a constant to derive a quotient;

eliminating a fractional part of said quotient; and adding an integer number to said quotient.

14. The method of claim 13, wherein said constant is two.

15. The method of claim 10, wherein said color range comprises 256 different color intensities.

16. The method of claim 10, wherein said step of quantizing includes the step of truncating said dithered color value to derive said dithered and quantized color value.

* * * * *